(12) United States Patent
Jiang et al.

(10) Patent No.: US 11,243,425 B2
(45) Date of Patent: Feb. 8, 2022

(54) DISPLAY SUBSTRATE, DISPLAY PANEL AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Jingjing Jiang, Beijing (CN); Dong Wang, Beijing (CN); Yongzhi Song, Beijing (CN); Jiyu Wan, Beijing (CN)

(73) Assignees: BEIJING BOE DISPLAY TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 825 days.

(21) Appl. No.: 16/077,990

(22) PCT Filed: Feb. 8, 2018

(86) PCT No.: PCT/CN2018/075729
§ 371 (c)(1),
(2) Date: Aug. 14, 2018

(87) PCT Pub. No.: WO2019/015307
PCT Pub. Date: Jan. 24, 2019

(65) Prior Publication Data
US 2021/0271129 A1  Sep. 2, 2021

(30) Foreign Application Priority Data
Jul. 20, 2017 (CN) .......................... 201710595219.4

(51) Int. Cl.
*G02F 1/1335* (2006.01)
*G02F 1/1333* (2006.01)

(52) U.S. Cl.
CPC .. *G02F 1/133514* (2013.01); *G02F 1/133308* (2013.01); *G02F 1/133512* (2013.01)

(58) Field of Classification Search
CPC ................................. G02F 1/133514
See application file for complete search history.

(56) References Cited

U.S. PATENT DOCUMENTS 6,734,944 B1 * 5/2004 Koseki ................ G02F 1/13394
349/155
2005/0134788 A1  6/2005 Park
(Continued)

FOREIGN PATENT DOCUMENTS

CN   1637491 A    7/2005
CN   102809847 A  12/2012
(Continued)

OTHER PUBLICATIONS

International Search Report and Written Opinion for Application No. PCT/CN2018/075729, dated Apr. 27, 2018, 11 Pages.

Primary Examiner — Edmond C Lau
(74) Attorney, Agent, or Firm — Brooks Kushman P.C.

(57) ABSTRACT

A display substrate includes a base substrate, a color filter layer, a black matrix and a passivation layer. The color filter layer, the black matrix and the passivation layer are arranged on the base substrate, the color filter layer includes: a plurality of color filter units; a plurality of white filter unit formed by a blank area; a black matrix disposed between the color filter unit and the white filter unit; and a pad layer arranged in the blank area, an orthogonality projection of the pad layer on the base substrate being located in an orthogonality projection of the blank area on the base substrate, and smaller than the orthogonality projection of the blank area on the base substrate.

18 Claims, 7 Drawing Sheets

(56) References Cited

U.S. PATENT DOCUMENTS

2012/0140143 A1* 6/2012 Wurzel ................ G02F 1/1333
                                                                 349/62
2014/0184972 A1* 7/2014 Park .................. G02F 1/133514
                                                                 349/43
2016/0209701 A1* 7/2016 Qin ........................ G02B 5/003

FOREIGN PATENT DOCUMENTS

| CN | 104503134 A | 4/2015 |
| CN | 104793391 A | 7/2015 |
| CN | 105607338 A | 5/2016 |
| CN | 107247359 A | 10/2017 |
| JP | 2007133343 A | 5/2007 |

* cited by examiner

DISPLAY SUBSTRATE, DISPLAY PANEL AND DISPLAY DEVICE

CROSS-REFERENCE TO RELATED APPLICATIONS

This application is the U.S. national phase of PCT Application No. PCT/CN2018/075729 filed on Feb. 8, 2018, which claims priority to Chinese Patent Application No. 201710595219.4 filed on Jul. 20, 2017, which are incorporated herein by reference in their entireties.

TECHNICAL FIELD

The present disclosure relates to a display substrate, a display panel and a display device.

BACKGROUND

With the rise of a global information society, the demand for various display devices has increased. Therefore, great efforts have been made in research and development of various flat display devices, such as liquid crystal display devices (LCDs), plasma display devices (PDPs), electroluminescence display devices (ELDs), and vacuum fluorescent display devices (VFDs).

Due to its low power consumption, low cost, radiation free and easy operation, liquid crystal display devices have been widely used in various fields such as homes, public places, offices and personal electronic related products. Liquid crystal display devices have also evolved from the original black and white display devices to today's color display devices, the most important is the addition of color filters, which have also evolved from the initial RGB form to the RGBW form. For the color filter of the RGBW form, it is common practice to form a white filter unit by laying a transparent photoresist between two color filter units composed of RGB, but since this method is costly, it is generally to form a blank area between the two color filter units directly to form a white filter unit.

However, due to the presence of the blank area, the light transmittance of the blank area is higher than that of the color filter unit, which is likely to cause uneven display brightness, and when a passivation layer is formed on the color filter, the segment step is relative large due to the presence of the blank area, and the passivation layer is liable to be broken.

SUMMARY

The embodiments of the present disclosure provide a display substrate. The display substrate a base substrate, a color filter layer, a black matrix and a passivation layer arranged on the base substrate, wherein the color filter layer comprises: a plurality of color filter units; a plurality of white filter unit formed by a blank area; a black matrix disposed between the color filter unit and the white filter unit; and a pad layer arranged in the blank area, an orthogonality projection of the pad layer on the base substrate being located in an orthogonality projection of the blank area on the base substrate, and smaller than the orthogonality projection of the blank area on the base substrate.

In some embodiments of the present disclosure, a height of an upper surface of the pad layer is the same as a height of an upper surface of the color filter unit.

In some embodiments of the present disclosure, the pad layer has a strip shape, and divides the white filter unit into two portions having a same area.

In some embodiments of the present disclosure, the pad layer has a cross shape, and divides the white filter unit into four portions having a same area.

In some embodiments of the present disclosure, the pad layer has a same material as the black matrix, a surface of the pad layer away from the base substrate is flush with a surface of the color filter layer away from the base substrate.

In some embodiments of the present disclosure, the surface of the pad layer away from the base substrate and the surface of the black matrix away from the base substrate are flush with surfaces of the color filter units in the color filter layer.

In some embodiments of the present disclosure, the pad layer comprises a light shielding layer and a support layer, the light shielding layer is laminated with the support layer, arranged between the support layer and the base substrate.

In some embodiments of the present disclosure, the light shielding layer and the black matrix are arranged at a same layer and made of a same material.

In some embodiments of the present disclosure, the support layer and the color filter units are arranged at a same layer and made of a same material.

In some embodiments of the present disclosure, the display substrate further includes a common electrode and an alignment film, wherein passivation layer covers the color filter layer and is located between the color filter layer and the common electrode, the alignment film is located on a side of the common electrode away from the color filter layer.

In some embodiments of the present disclosure, the color filter units are spaced apart from the white filter unit and arranged in a matrix, a blank area is disposed between the two adjacent color filter units to form the white filter unit, the color filter unit includes a red filter unit, a green filter unit, and a blue filter unit, the red filter unit, the green filter unit, and the blue filter unit are sequentially arranging to form the color filter unit.

In some embodiments of the present disclosure, the color filter layer is disposed adjacent to the base substrate, the black matrix is disposed between the color filter unit and the white filter unit, between the red filter unit and the green filter unit, and between the green filter unit and the blue filter unit.

A display panel is provided and it includes a display substrate, an opposite substrate, a liquid crystal layer, and a plastic frame, the display substrate is opposite to the opposite substrate, the liquid crystal layer and the plastic frame is arranged between the display substrate and the opposite substrate, and the liquid crystal layer is received in a cavity formed by the display substrate, the opposite substrate and the plastic frame.

A display device is provided, it includes a display panel and a backlight assembly, wherein the display panel and the backlight assembly are stacked to each other to form a display assembly of the display device, the display device includes a display area and a peripheral area surrounding the display area, the display area is used to implement a display output function of the display device, and the peripheral area is used for layout of the lines, the plastic form is arranged in the peripheral area of the display device.

BRIEF DESCRIPTION OF THE DRAWINGS

In order to more clearly illustrate the technical solutions of the embodiments of the present disclosure, the embodiments of the present disclosure will be briefly described by combining the drawings. It is obvious that the drawings in the following description are only used to illustrate some embodiments of the present disclosure. Other drawings may also be obtained by a person skilled in the art based on these drawings.

DETAILED DESCRIPTION

The technical solutions of the present disclosure are clearly and completely described below in conjunction with the accompanying drawings. Obviously, the embodiments are only a part of embodiments, but not all embodiments. All other embodiments obtained by a person skilled in the art without creative work are all within the scope of the disclosure.

Figure 1:
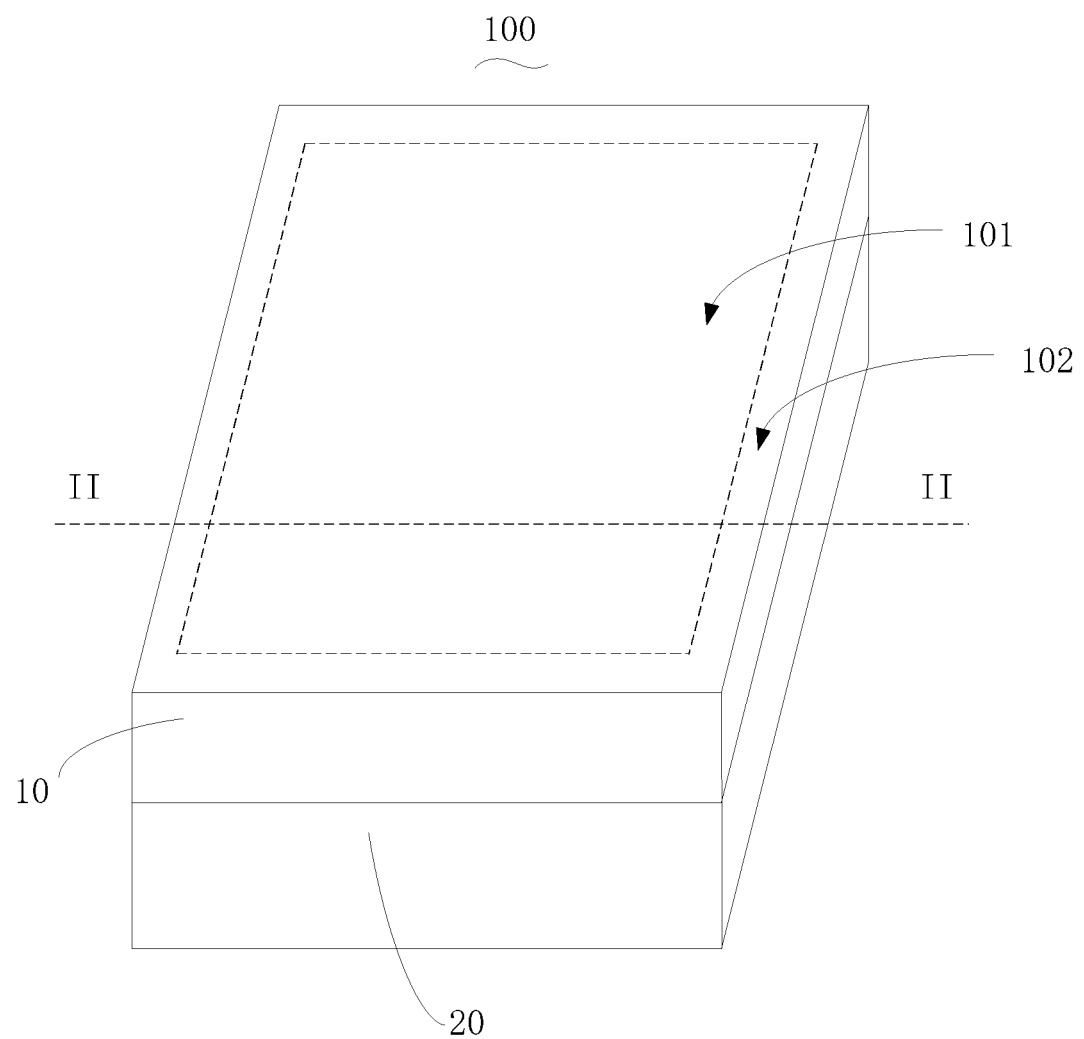
FIG. 1 is a perspective view of a display device according to an embodiment of the present disclosure.

FIG. 1 is a perspective view of a display device according to an embodiment of the present disclosure. As shown in FIG. 1, the display device 100 includes a display panel 10 and a backlight assembly 20. The display panel 10 and the backlight assembly 20 are stacked to each other to form a display assembly of the display device 100, to implement the display function of the display device 100. The display device 100 includes a display area 101 and a peripheral area 102 surrounding the display area 101. The display area 101 is mainly used to implement a display output function of the display device 100, and the peripheral area 102 is mainly used for layout of the lines.

Figure 2:
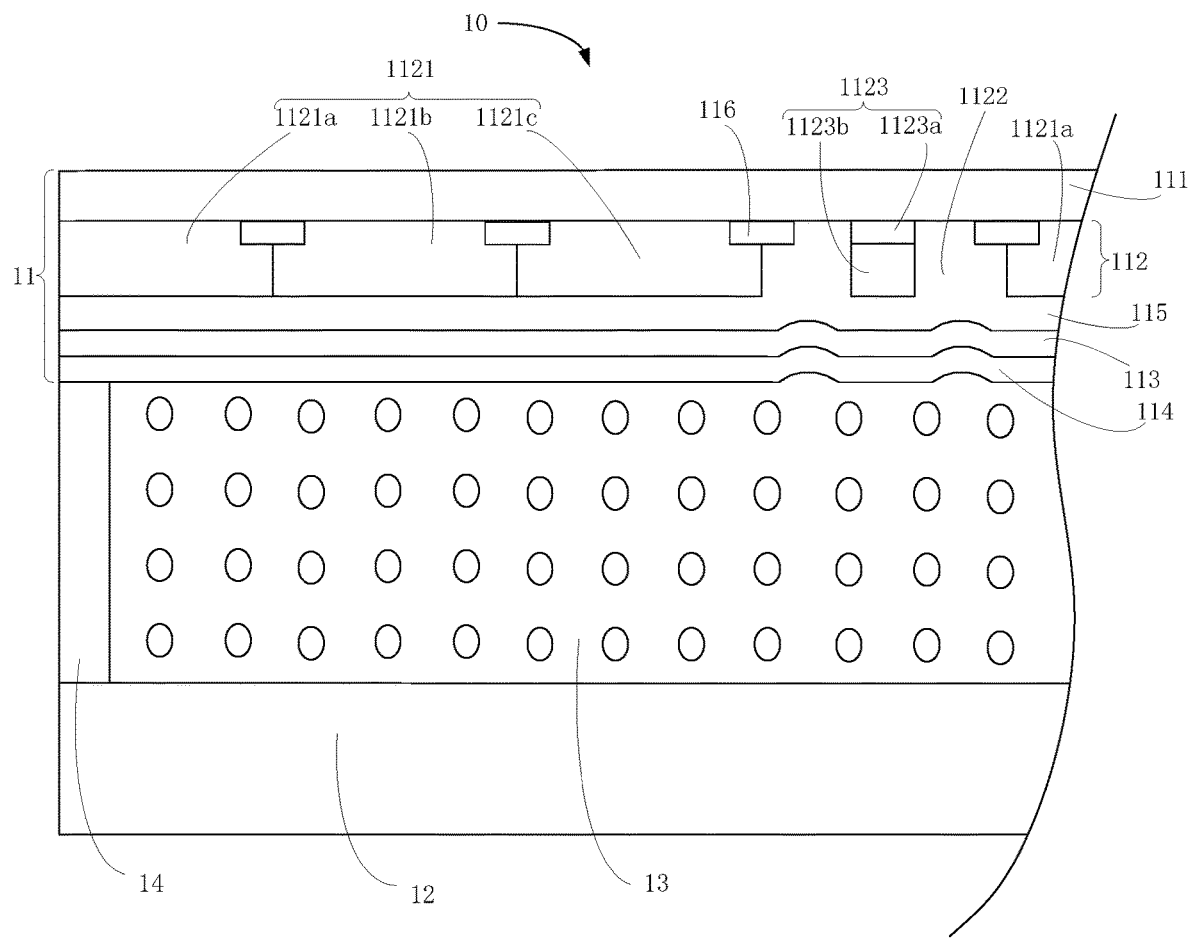
FIG. 2 is a partial cross-sectional view of the display panel along II-II as shown in FIG. 1.

FIG. 2 is a partial cross-sectional view of the display panel along II-II as shown in FIG. 1. As shown in FIG. 2, the display panel 10 further includes a display substrate 11, an opposite substrate 12, a liquid crystal layer 13, and a plastic frame 14. The display substrate 11 is opposite to the opposite substrate 12, the liquid crystal layer 13 and the plastic frame 14 is arranged between the display substrate 11 and the opposite substrate 12, and the liquid crystal layer 13 is received in a cavity formed by the display substrate 11, the opposite substrate 12, and the plastic frame 14. The plastic frame 14 is correspondingly located in the peripheral area 102 of the display device 100. The display substrate 11 may be one of a thin film transistor array substrate and a color filter substrate, and the opposite substrate 12 is the other of the thin film transistor array substrate and the color filter substrate.

In the embodiment of the present disclosure, the display substrate 11 includes a base substrate 111, a color filter layer 112, a common electrode 113, an alignment film 114, and a passivation layer 115. The color filter layer 112, the common electrode 113, and the alignment film 114 and the passivation layer 115 are disposed on the base substrate 111. The passivation layer 115 covers the color filter layer 112 and is located between the color filter layer 112 and the common electrode 113. The alignment film 114 is located on a side of the common electrode 113 away from the color filter layer 112.

In the present embodiment, the display substrate 11 is a color filter substrate, and the opposite substrate 12 is a thin film transistor array substrate. However, the present disclosure is not limited thereto, and in other embodiments, the display substrate 11 is a thin film transistor array substrate, and the opposite substrate 12 is a color filter substrate, and is not limited thereto.

In this embodiment, the common electrode 113 is located on the display substrate 11, that is, on the color filter substrate. However, the present disclosure is not limited thereto. In other embodiments, the common electrode 113 may be located on the opposite substrate 12, that is, on the thin film transistor array substrate, and is not limited thereto.

The color filter layer 112 includes a plurality of color filter units 1121 and a plurality of white filter units 1122. The color filter units 1121 are spaced apart from the white filter units 1122 and arranged in a matrix. A blank area is disposed between two adjacent color filter units 1121 to form the white filter unit 1122. The color filter unit 1121 includes a red filter unit 1121a, a green filter unit 1121b, and a blue filter unit 1121c. The red filter unit 1121a, the green filter unit 1121b, and the blue filter unit 1121c are sequentially arranging to form the color filter unit.

The display substrate 11 further includes a black matrix 116. The color filter layer 112 is disposed adjacent to the base substrate 111. The black matrix 116 is disposed between the color filter unit 1121 and the white filter unit 1122, between the red filter unit 1121a and the green filter unit 1121b, and between the green filter unit 1121b and the blue filter unit 1121c.

Figure 3:
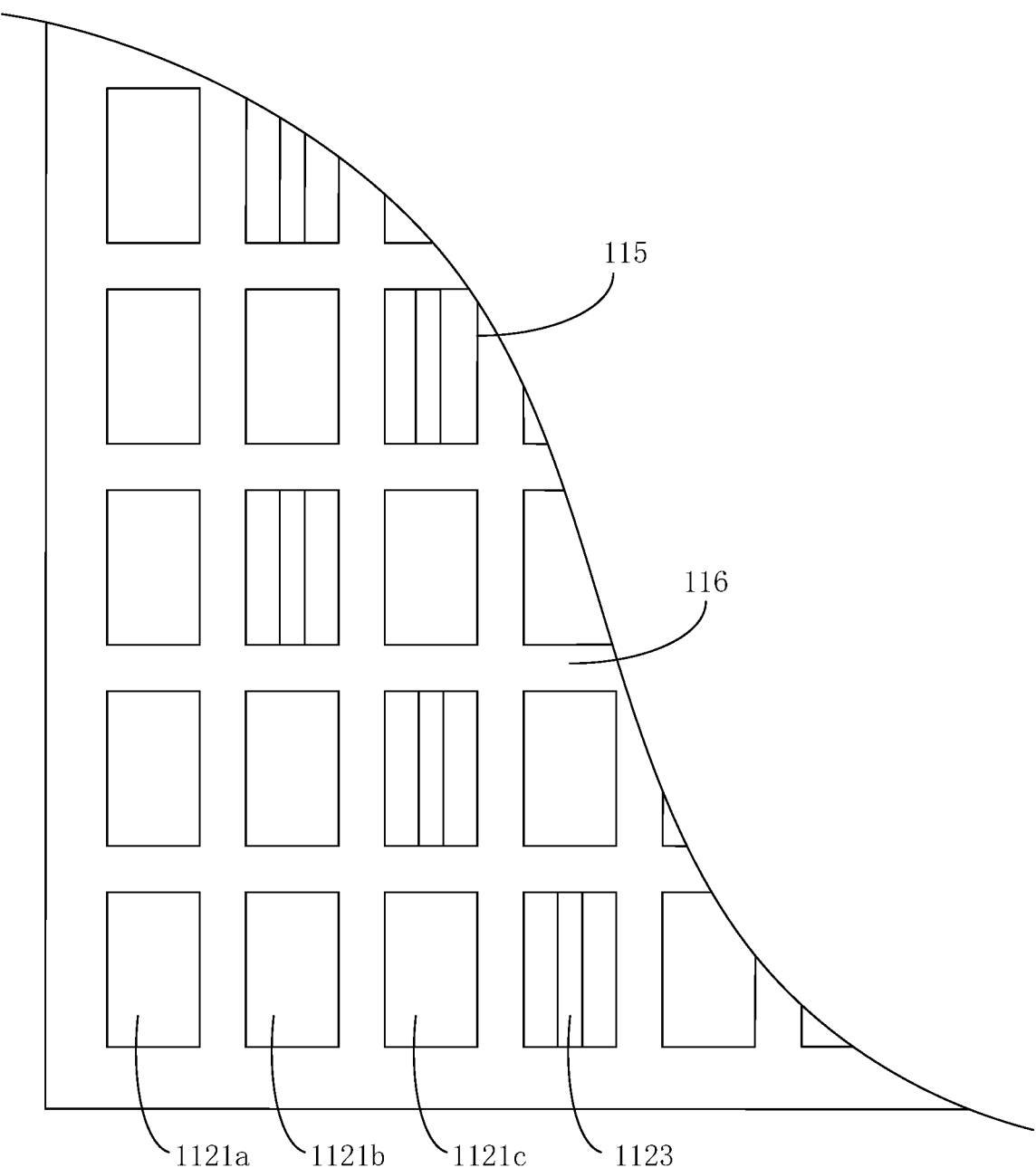
FIG. 3 is a partial plan view of the display substrate shown in FIG. 2.

In this embodiment, the black matrix 116 is located on the display substrate as an example. However, the present disclosure is not limited thereto. In other modes, the black matrix may be located on the opposite substrate, or the black matrix and the filter unit form a color filter layer, the color filter layer is located on the opposite substrate, and is not limited thereto FIG. 3 is a partial plan view of the display substrate shown in FIG. 2. As shown in FIG. 2 and FIG. 3, the color filter layer 112 further includes a pad layer 1123, the pad layer 1123 is located in a blank area forming the white filter unit 1122, and the orthogonality projection of the pad layer 1123 on the base substrate 111 is located within the orthogonality projection of the white filter unit 1122 on the base substrate and is smaller than the orthogonality projection of the white filter unit 1122 on the base substrate 111.

In this way, by providing the pad layer 1123 in the white filter unit 1122, the segment step the passivation layer 115 caused when covering the color filter layer 112 can be reduced. The white filter unit 1122 is divided into several small regions, so as to ensure the light transmittance of the white filter unit 1122 while decreasing the aperture ratio of the white filter unit 1122. The brightness of the white filter unit 1122 and the brightness of the color filter unit 1121 are kept the same without an additional control circuit, thereby avoiding uneven brightness display of the display device 100.

The pad layer 1123 includes a light shielding layer 1123a and a support layer 1123b. The light shielding layer 1123a is laminated with the support layer 1123b, and the light shielding layer 1123a is located between the support layer 1123b and the base substrate 111.

In this embodiment, the light shielding layer 1123*a* and the black matrix 116 are located in the same layer, the light shielding layer 1123*a* and the black matrix 116 may be formed in the same process, and the light shielding layer 1123*a* and the black matrix 116 are made of a same material. The support layer 1123*b* is located in the same layer as the color filter unit 1121, the support layer 1123*b* and the color filter unit 1121 may be formed in the same process, and the support layer 1123*b* and the color filter unit 1121 are made of a same material.

Specifically, the support layer 1123*b* may be made in the same process and made of a same material as any one of the red filter unit 1121*a*, the green filter unit 1121*b*, or the blue filter unit 1121*c*.

Optionally, the height of the upper surface of the pad layer 1123 is the same as the height of the upper surface of the color filter unit 1121, but is not limited thereto. In other embodiments, the height of the upper surface of the pad layer 1123 may also be slightly higher than the height of the upper surface of the color filter unit 1121.

In this embodiment, the pad layer 1123 has a strip shape, and the pad layer 1123 extends along the length direction of the white filter unit 1122. The pad layer 1123 is located in the middle of the white filter unit 1122 and coincides with the symmetry axis of the white filter unit 1122, so as to divide the white filter unit 1122 into two portions having a same area. However, the present disclosure is not limited thereto. In other embodiments, the pad layer may be extended along a width direction of the white filter unit or the diagonal direction of the white filter unit.

Figure 4:
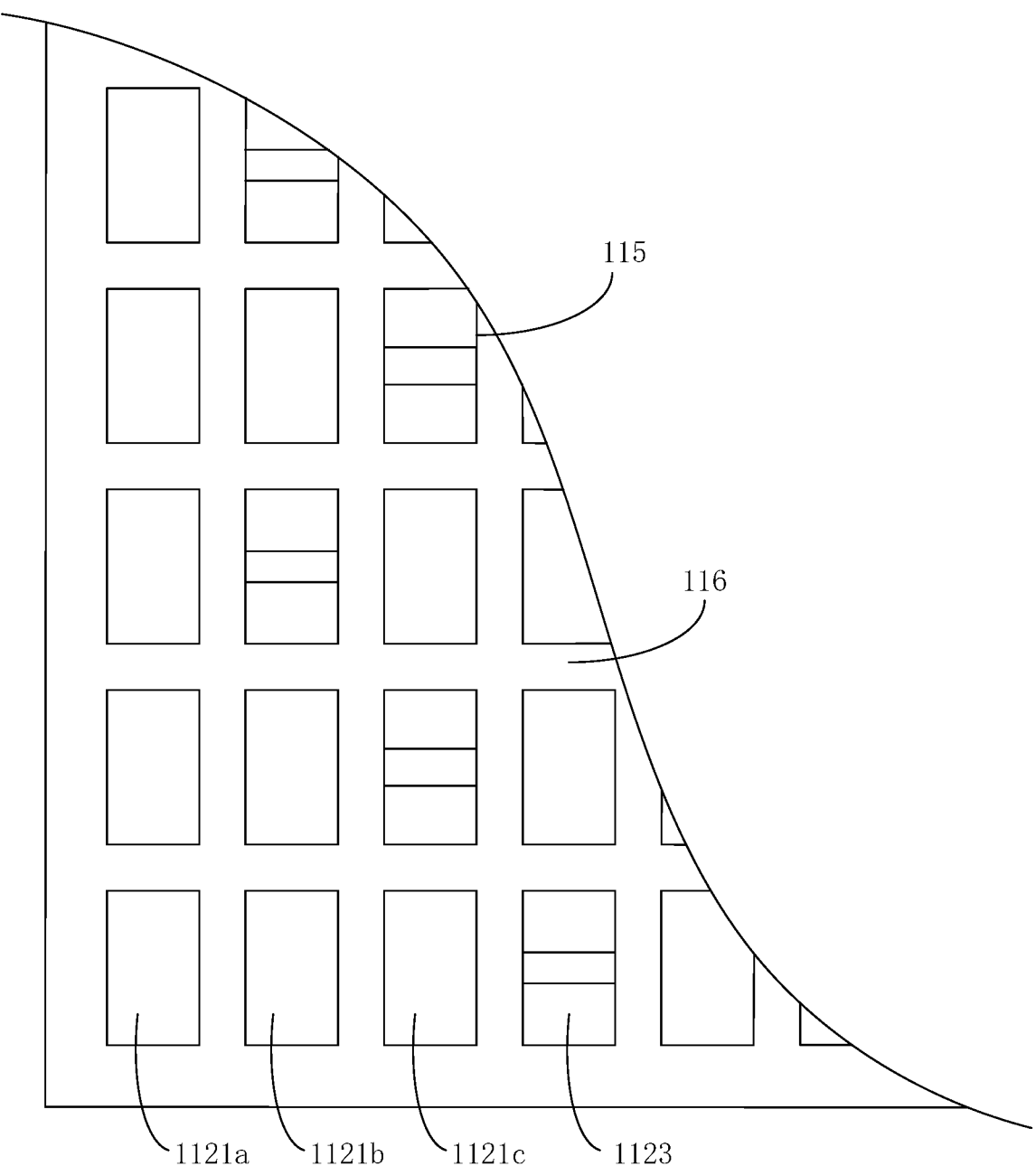
FIG. 4 is a partial plan view of a display substrate in another embodiment of the present disclosure.

In the present embodiment, the pad layer 1123 extends along the length direction of the white filter unit 1122. However, the present disclosure is not limited thereto. In other embodiments, as shown in FIG. 4, the pad layer may extend along the width direction of the white filter unit.

Figure 5:
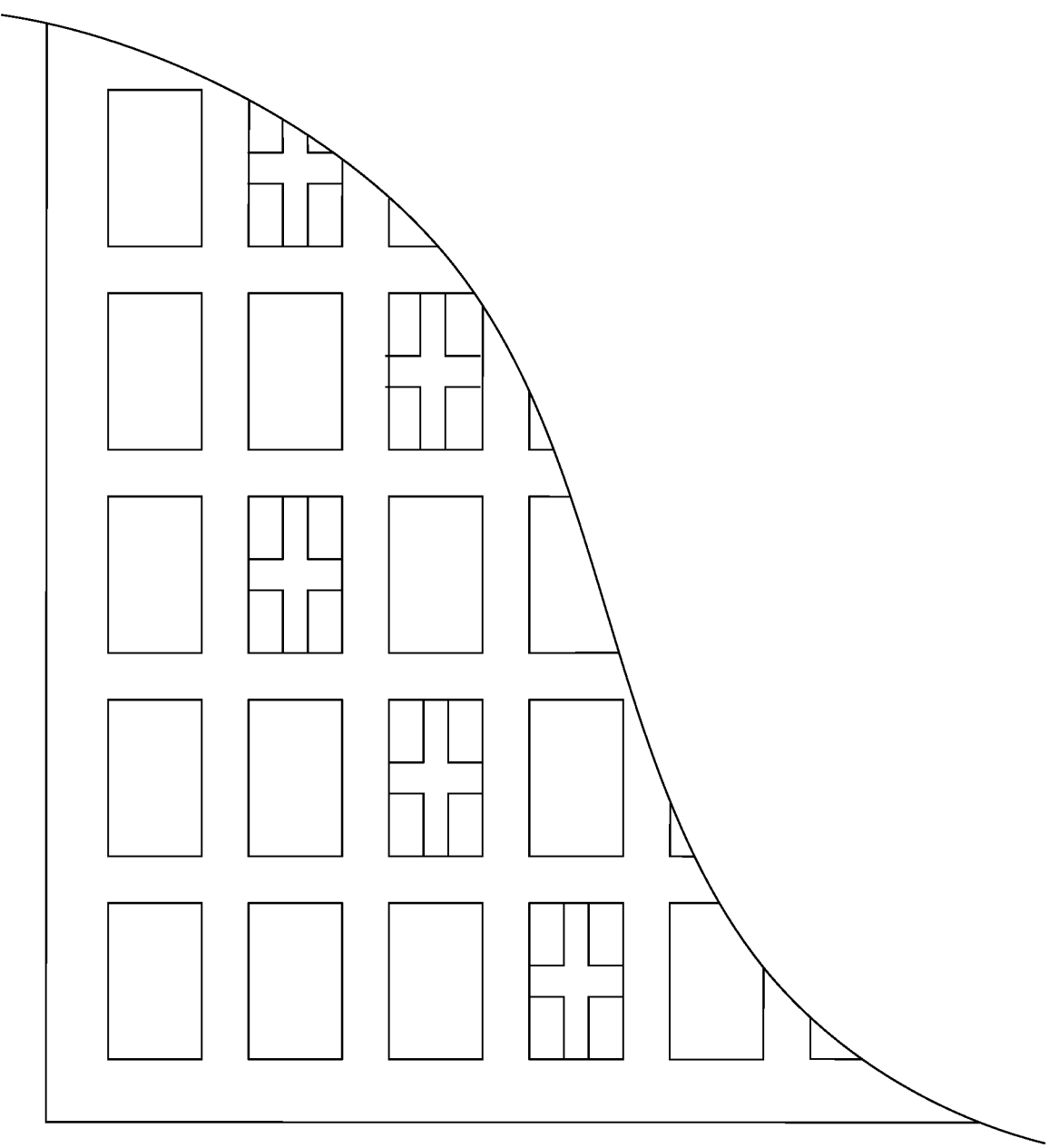
FIG. 5 is a partial plan view of a display substrate in still another embodiment of the present disclosure.

In the present embodiment, the pad layer has a strip shape, but is not limited thereto. In other embodiments, the pad layer may also have a cross or other shape as shown in FIG. 5. As shown in FIG. 5, the pad layer has a cross shape and is located at the position of the symmetry axis of the white filter unit, so as to divide the white filter unit into four portions having an equal area. FIG. 5 is a partial plan view of a display substrate in another embodiment of the present disclosure.

Figure 6:
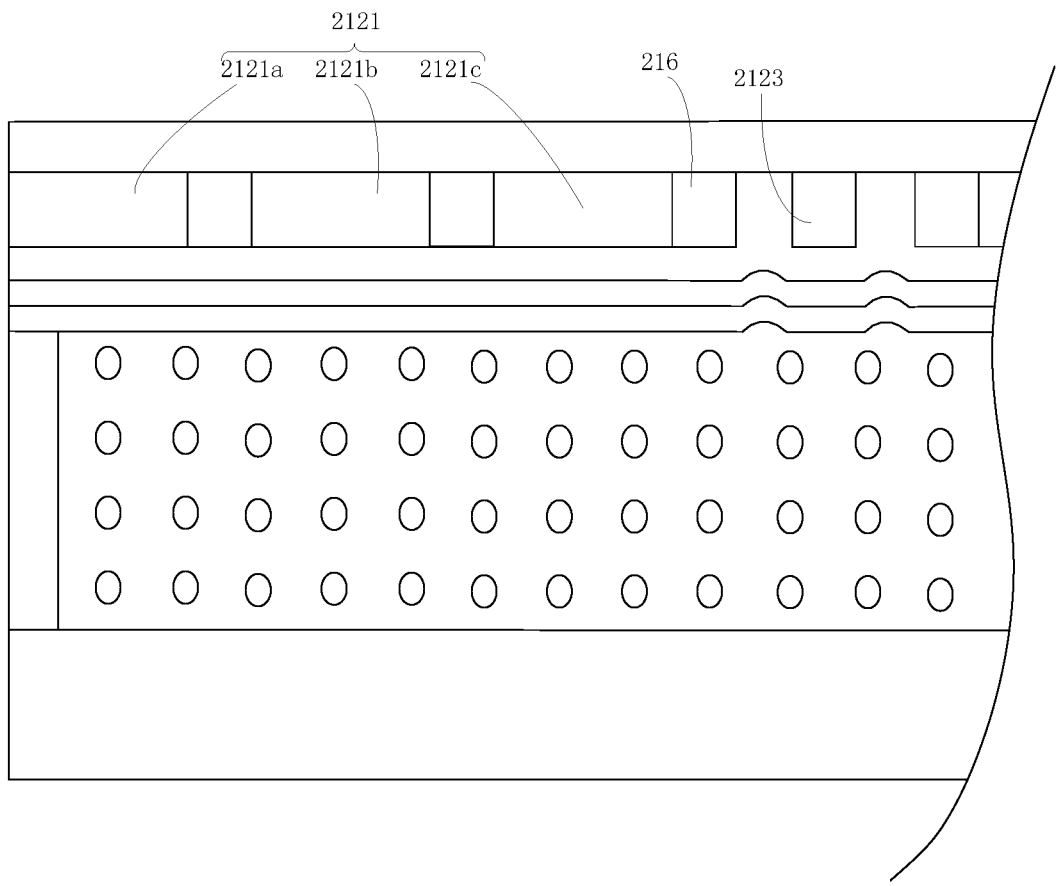
FIG. 6 is a partial cross-sectional view showing a display substrate in still another embodiment of the present disclosure.

FIG. 6 is a partial cross-sectional view of the display substrate in still another embodiment of the present disclosure. As shown in FIG. 6, the embodiment shown in FIG. 6 is different from the embodiment shown in FIG. 2 in that the upper surface of the pad layer 2123 and the black matrix 216, that is, the surface away from the base substrate is flush with a surface of the color filter layer away from the base substrate. The color filter unit 2121 is composed of the red filter unit 2121*a*, the green filter unit 2121*b*, and the blue filter unit 2121*c*. The black matrix 216 and the color filter unit 2121 are located in the same layer, the pad layer 2123 and the black matrix 216 are located in the same layer, and the pad layer 2123 can be formed in the same process and same material as the black matrix 216.

Figure 7:
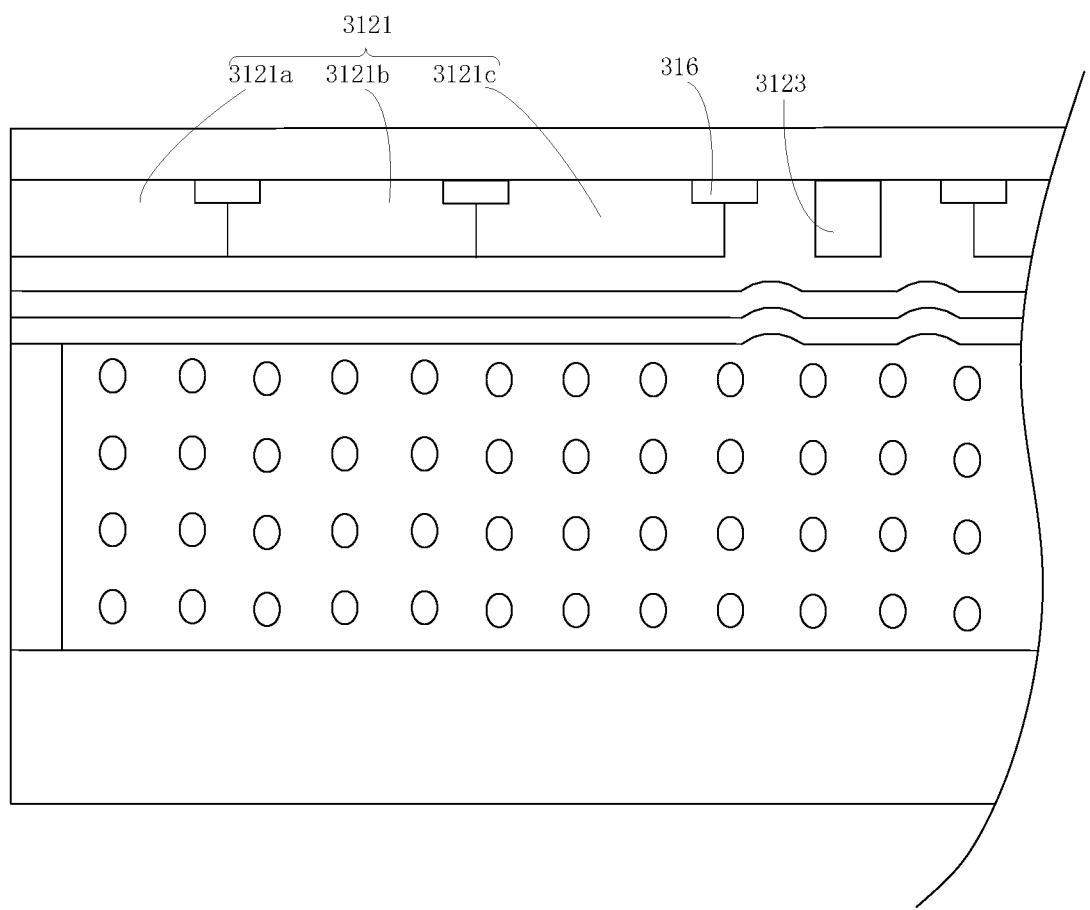
FIG. 7 is a partial cross-sectional view of a display substrate in still another embodiment of the present disclosure.

FIG. 7 is a partial cross-sectional view of the display substrate in still another embodiment of the present disclosure. As shown in FIG. 7, the embodiment shown in FIG. 7 is different from the embodiment shown in FIG. 2 in that the pad layer 3123 and the color filter unit 3121 composed of a red filter unit 3121*a*, a green filter unit 3121*b*, and a blue filter unit 3121*c* are located in the same layer, and the pad layer 3123 can be formed in the same process and made of the same material as the black matrix 316.

The display substrate, the display panel and the display device provided by the embodiments of the present disclosure are provided with a pad layer in a blank area of the white filter unit, so that the orthogonality projection of the pad layer on the base substrate is located in the orthogonality projection of the blank area on the base substrate, and smaller than the orthogonality projection of the blank area on the substrate. In this way, dividing the blank area into several small areas through the pad layer can not only improve evenness of the passivation layer after coating, but also keep the light transmittance of the white filter unit while reducing the aperture ratio of the white filter unit. Therefore, the brightness of the white filter unit is consistent with the brightness of the color filter unit.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display substrate including a base substrate, a color filter layer, a black matrix and a passivation layer, wherein the color filter layer, the black matrix and the passivation layer are arranged on the base substrate, the color filter layer comprises:
   a plurality of color filter units;
   a plurality of white filter unit formed by a blank area;
   a black matrix disposed between the color filter unit and the white filter unit; and
   a pad layer arranged in the blank area, an orthogonality projection of the pad layer on the base substrate being located in an orthogonality projection of the blank area on the base substrate, and smaller than the orthogonality projection of the blank area on the base substrate;
   wherein the pad layer has a same material as the black matrix, a surface of the pad layer away from the base substrate is flush with a surface of the color filter layer away from the base substrate.

2. The display substrate according to claim 1, wherein a height of an upper surface of the pad layer is the same as a height of an upper surface of the color filter unit.

3. The display substrate according to claim 1, wherein the pad layer has a strip shape, and divides the white filter unit into two portions having a same area.

4. The display substrate according to claim 1, wherein the pad layer has a cross shape, and divides the white filter unit into four portions having a same area.

5. The display substrate according to claim 1, wherein the surface of the pad layer away from the base substrate and the surface of the black matrix away from the base substrate are flush with surfaces of the color filter units in the color filter layer.

6. The display substrate according to claim 1, wherein the pad layer comprises a light shielding layer and a support layer, the light shielding layer is laminated with the support layer, arranged between the support layer and the base substrate.

7. The display substrate according to claim 6, wherein the light shielding layer and the black matrix are arranged at a same layer and made of a same material.

8. The display substrate according to claim 6, wherein the support layer and the color filter units are arranged at a same layer and made of a same material.

9. The display substrate according to claim 1, further comprising a common electrode and an alignment film, wherein passivation layer covers the color filter layer and is located between the color filter layer and the common electrode, the alignment film is located on a side of the common electrode away from the color filter layer.

10. The display substrate according to claim 1, wherein the color filter units are spaced apart from the white filter unit and arranged in a matrix, a blank area is disposed between two adjacent color filter units to form the white filter unit, the color filter unit includes a red filter unit, a green filter unit, and a blue filter unit, the red filter unit, the green filter unit, and the blue filter unit are sequentially arranging to form the color filter unit.

11. The display substrate according to claim 10, wherein the color filter layer is disposed adjacent to the base substrate, the black matrix is disposed between the color filter unit and the white filter unit, between the red filter unit and the green filter unit, and between the green filter unit and the blue filter unit.

12. A display panel, comprising a display substrate according to claim 1, an opposite substrate, a liquid crystal layer, and a plastic frame, wherein
the display substrate is opposite to the opposite substrate, the liquid crystal layer and the plastic frame is arranged between the display substrate and the opposite substrate, and the liquid crystal layer is received in a cavity formed by the display substrate, the opposite substrate and the plastic frame.

13. The display panel according to claim 12, wherein the display substrate is one of a thin film transistor array substrate and a color filter substrate, and the opposite substrate is the other of the thin film transistor array substrate and the color filter substrate.

14. A display device comprising a display panel according to claim 12 and a backlight assembly, wherein
the display panel and the backlight assembly are stacked to each other to form a display assembly of the display device, the display device includes a display area and a peripheral area surrounding the display area, the display area is used to implement a display output function of the display device, and the peripheral area is used for layout of lines, a plastic form is arranged in the peripheral area of the display device.

15. A display device comprising a display panel according to claim 13 and a backlight assembly, wherein
the display panel and the backlight assembly are stacked to each other to form a display assembly of the display device, the display device includes a display area and a peripheral area surrounding the display area, the display area is used to implement a display output function of the display device, and the peripheral area is used for layout of lines, a plastic form is arranged in the peripheral area of the display device.

16. A display substrate including a base substrate, a color filter layer, a black matrix and a passivation layer, wherein the color filter layer, the black matrix and the passivation layer are arranged on the base substrate, the color filter layer comprises:
a plurality of color filter units;
a plurality of white filter unit formed by a blank area;
a black matrix disposed between the color filter unit and the white filter unit; and
a pad layer arranged in the blank area, an orthogonality projection of the pad layer on the base substrate being located in an orthogonality projection of the blank area on the base substrate, and smaller than the orthogonality projection of the blank area on the base substrate,
wherein the pad layer comprises a light shielding layer and a support layer, the light shielding layer is laminated with the support layer, arranged between the support layer and the base substrate.

17. The display substrate according to claim 16, wherein the light shielding layer and the black matrix are arranged at a same layer and made of a same material.

18. The display substrate according to claim 16, wherein the support layer and the color filter units are arranged at a same layer and made of a same material.

* * * * *